(12) United States Patent
Zhao et al.

(10) Patent No.: US 12,049,405 B2
(45) Date of Patent: Jul. 30, 2024

(54) ADDITIVE MANUFACTURING OF SILICA AEROGEL OBJECTS

(71) Applicant: EMPA Eidgenoessische Materialpruefungs- und Forschungsanstalt, Duebendorf (CH)

(72) Inventors: Shanyu Zhao, Duebendorf (CH); Gilberto De Freitas Siqueira, Zurich (CH); Wim Malfait, Zurich (CH); Matthias Koebel, Bruettisellen (CH); Christopher Ubert, Broadview Heights, OH (US); David Norris, Munich (DE)

(73) Assignee: EMPA Eidg. Materialprafungs-und Forschungsartalt, Dübendorf (CH)

( * ) Notice: Subject to any disclaimer, the term of this patent is extended or adjusted under 35 U.S.C. 154(b) by 116 days.

(21) Appl. No.: 17/775,415

(22) PCT Filed: Nov. 6, 2020

(86) PCT No.: PCT/EP2020/081340
§ 371 (c)(1),
(2) Date: May 9, 2022

(87) PCT Pub. No.: WO2021/089815
PCT Pub. Date: May 14, 2021

(65) Prior Publication Data
US 2023/0212017 A1    Jul. 6, 2023

(30) Foreign Application Priority Data

Nov. 8, 2019  (EP) ..................... 19208179
May 13, 2020  (EP) ..................... 20174542

(51) Int. Cl.
*C01B 33/16*    (2006.01)
*B33Y 10/00*    (2015.01)
(Continued)

(52) U.S. Cl.
CPC .......... *C01B 33/1585* (2013.01); *B33Y 10/00* (2014.12); *B33Y 40/20* (2020.01);
(Continued)

(58) Field of Classification Search
CPC ..... C01B 33/158; C01B 33/16; C01B 33/187; B33Y 40/20; B33Y 10/00; B33Y 70/00;
(Continued)

(56) References Cited

U.S. PATENT DOCUMENTS 10,400,071 B2 * 9/2019 Achenbach ................. C08J 3/24
11,207,841 B2 * 12/2021 Huang ................... B33Y 10/00
(Continued)

FOREIGN PATENT DOCUMENTS

CN      107555422 A    1/2018
EP      2927194 A1    10/2015
(Continued)

OTHER PUBLICATIONS

Baumann et al., Control of Nanoparticle Release Kinetics from 3D Printed Hydrogel Scaffolds, Angewandte Chemie, International Edition, 56, 4623-4628 (2017).
Database WPI Thomson Scientific, London, GB; vol. 2013, No. 08, AN 2011-P71418, XP002800746A & KR 20110125773 A (Finetec Corp) Nov. 22, 2011 (Nov. 22, 2011).
(Continued)

*Primary Examiner* — Christopher M Rodd
*Assistant Examiner* — Shibin Liang
(74) *Attorney, Agent, or Firm* — Agris & von Natzmer LLP; Joyce von Natzmer (57) ABSTRACT

An ink composition for additive manufacture of silica aerogel objects essentially consists of a gellable silica sol containing an admixture of 30 to 70 vol. % of a mesoporous silica powder in a base solvent. The mesoporous silica powder has a particle size range of 0.001 to 1 mm and a tap
(Continued)

density of 30 to 200 kg/m3 and comprises at least 10% by weight of silica aerogel powder. The composition has a yield stress in the range of 30 to 3000 Pa and a viscosity of 5 to 150 Pa·s at a shear rate of 50 s-1. Furthermore, the composition has shear thinning properties defined as a reduction in viscosity by a factor between 10 and 103 for an increase in shear rate by a factor of 104 to 105. A method of additive manufacturing of a three-dimensional silica aerogel object by direct ink writing comprises providing such ink composition, forcing the same through a convergent nozzle, thereby forming a jet of the ink composition which is directed in such manner as to form a three-dimensional object by additive manufacturing. After initiating and carrying out gelation of the gellable silica sol constituting said object, a drying step yields the desired three-dimensional silica aerogel object.

23 Claims, 4 Drawing Sheets

(51) Int. Cl.
| | |
|---|---|
| *B33Y 40/20* | (2020.01) |
| *B33Y 70/00* | (2020.01) |
| *C01B 33/158* | (2006.01) |
| *C09D 11/033* | (2014.01) |
| *C09D 11/037* | (2014.01) |
| *C09D 11/322* | (2014.01) |
| *C09D 11/36* | (2014.01) |

(52) U.S. Cl.
CPC ............ *B33Y 70/00* (2014.12); *C09D 11/033* (2013.01); *C09D 11/037* (2013.01); *C09D 11/322* (2013.01); *C09D 11/36* (2013.01)

(58) Field of Classification Search
CPC ..... C09D 11/322; C09D 11/36; C09D 11/037; B29C 64/112
See application file for complete search history.

(56) References Cited

U.S. PATENT DOCUMENTS

| | | | |
|---|---|---|---|
| 2013/0189521 A1* | 7/2013 | Fukuju | ................... C01B 33/16 |
| | | | 252/62 |
| 2018/0148378 A1 | 5/2018 | Mayr et al. | |

FOREIGN PATENT DOCUMENTS

| | | | |
|---|---|---|---|
| JP | 2019019019 A | 2/2019 | |
| KR | 20110125773 A | 11/2011 | |
| WO | 2007129849 | * 11/2007 | ........... C01B 33/187 |
| WO | 2016161123 A1 | 10/2016 | |
| WO | 2016191162 A1 | 12/2016 | |
| WO | 2017029673 A1 | 2/2017 | |

OTHER PUBLICATIONS

Database WPI Thomson Scientific, London, GB; vol. 2019, No. 14, AN 2019-136889, XP002800745A & JP 2019019019 A (Tokuyama Corp) Feb. 7, 2019 (Feb. 7, 2019).
Fu et al., Graphene Oxide-Based Electrode Inks for 3D-Printed Lithium-Ion Batteries, Advanced Materials 28, 2587-2594 (2016).
Garcia-Tuñon et al., Printing in three dimensions with graphene, Advanced Materials 27, 1688-1693 (2015).
Jakus et al., Three-dimensional printing of high-content graphene scaffolds for electronic and biomedical applications, ACS Nano 9, 4636-4648 (2015).
Maleki et al., Compressible, Thermally Insulating, and Fire Retardant Aerogels through Self-Assembling Silk Fibroin Biopolymers Inside a Silica Structure—An Approach towards 3D Printing of Aerogels, ACS Appl. Mater. Interfaces 10 (26), 22718-22730 (2018).
Zhang et al., 3D printing of graphene aerogels, Small, No. 13, 1702-1708 (Dec. 2016).
Zhao et al., Additive manufacturing of silica aerogels, Nature, vol. 584, 387 (Aug. 20, 2020) (XP037223583).
Zhu et al., Highly compressible 3D periodic graphene aerogel microlattices, Nature communications, 6, 1-8 (2015).
Zocca et al., 3D-printed silicate porous bioceramics using a non-sacrificial preceramic polymer, Biofabrication, 7(2), 025008 (2015).

* cited by examiner

ADDITIVE MANUFACTURING OF SILICA AEROGEL OBJECTS

CROSS-REFERENCE TO RELATED APPLICATIONS

This is the U.S. national stage of International application PCT/EP2020/081340, filed Nov. 6, 2020 designating the United States and claiming priority to European patent applications EP 19208179.2, filed Nov. 8, 2019 and EP 20174542.9, filed May 13, 2020 which are incorporated herein by reference in their entireties.

FIELD OF THE INVENTION

The invention generally relates to the field of additive manufacture of silica aerogel containing objects.

BACKGROUND OF THE INVENTION

Aerogels are bottom-up porous solid materials exhibiting remarkably record-breaking properties, such as a combination of low density, high specific surface area and low thermal conductivity. Among aerogels, silica aerogels are most the widely studied and applied; they exhibit a high-temperature resistance and can be easily fabricated in well-defined shapes. These properties render aerogels a promising candidate for different applications such as thermal insulation, drug delivery, absorption and catalyst support.

The typical production of silica aerogels is a bottom-up sol-gel process: a silica precursor such as tetraethyl orthosilicate (TEOS), tetramethyl orthosilicate (TMOS), sodium silicate, etc. is hydrolyzed or acidified to form a colloidal suspension, also known as "sol". To this sol, any number of polymers or other additives may be added to vary the final performance of the material to be obtained. The sol is then coerced into becoming a gel either by heating or by addition of a catalyst, e.g. a base or an acid, depending on the precursor used, or simply by allowing to stand for an extended period of time. Optionally, a solvent exchange or surface modification step may be carried out on the gel. Finally, the gel is dried by way of ambient pressure drying, freeze drying, or supercritical dying.

Additive manufacturing (AM), also called "3D printing", refers to a broad range of light and ink-based printing technology used to manufacture a three-dimensional object. The term "ink" is used by analogy of the conventional printing technology comprising deposition of an ink layer according to a predetermined pattern. 3D objects of almost any geometry can be produced by stacking "2D printed" layers each having an appropriate pattern. The latter is generally provided using digital model data. Accordingly, AM or 3D printing based on ink deposition is also called "Direct Ink Writing" (DIW).

Unlike the traditional sol-gel manufacturing methods used for the formation of aerogel objects, AM can rapidly produce almost any geometry and, furthermore, allows for varying local composition. In fact, the construction of silica aerogel materials by using AM has already been contemplated.

WO 2017/029673 A1 is dedicated to developing 3D polymerizable ceramic inks. Example 17 describes providing a sol-based ink formulation comprising two silica precursors (TEOS and APTMS) as an acidic solution in an alcohol-water solvent followed by the addition of a basic catalyst. The resulting gel was then printed by the so-called digital light processing (DLP) method, which implies the inclusion of a photocurable polymer.

WO 2016/161123 A1 deals with the synthesis of polyurethane, polyimide, silica polymer crosslinked hybrid aerogels by using the sol-gel route.

WO 2016/191162 A1 describes additive manufacturing of ceramic structures using a sol containing nanoparticles. The process includes a sol-gel step as well as the creation of a ceramic aerogel using heat treatment. The printing sol is made using a solvent, nanosized particles, radiation curable monomer(s) and photoinitiator. Later, this printed structure is transferred into a gel state after which the gel is heat treated and the resulting structure is an aerogel. The process necessarily includes curable monomers/polymers and a photoinitator.

CN 107555422 A discloses the additive manufacturing of graphene oxide-based materials. This technique involves large particles of graphene oxide dispersed in an aqueous solution. The sol is then printed and heat treated to obtain a carbon-based aerogel.

US 2013/189521 A1, JP 2019-019019A, KR 2011-0125773 A and EP 2927194 A1 describe compositions and methods for the manufacture of silica aerogel objects.

US 2018/148378 A1 describes a process for producing a ceramic article using a sol containing nano-sized particles.

In the scientific literature there are descriptions of direct printing of hydrogels [1], graphene aerogels [2-6] and aerogel-like, porous bio-ceramics [7]. A recent article [8] reported a sol-gel approach to 3D print silk fibroin-silica aerogel hybrid, the ink formulation consisting of tetramethyl orthosilicate, 5-(trimethoxysilyl)pentanoic acid, silk fibroin and hexadecyltrimethylammonium bromide. The necessary viscosity is reached by heating up the sol to form partial gelation, but it is very difficult to precisely control the filament size and shape, and the ink printing parameter is hardly reproducible.

REFERENCES

1. Baumann, B., T. Jungst, S. Stichler, S. Feineis, O. Wiltschka, M. Kuhlmann, M. Lindén, and J. Groll, Control of Nanoparticle Release Kinetics from 3D Printed Hydrogel Scaffolds. Angewandte Chemie International Edition, 2017. DOI: 10.1002/anie.201700153.
2. Zhu, C., T. Y.-J. Han, E. B. Duoss, A. M. Golobic, J. D. Kuntz, C. M. Spadaccini, and M. A. Worsley, Highly compressible 3D periodic graphene aerogel microlattices. Nature communications, 2015. 6.
3. Zhang, Q., F. Zhang, S. P. Medarametla, H. Li, C. Zhou, and D. Lin, 3D printing of graphene aerogels. Small, 2016.
4. Fu, K., Y. Wang, C. Yan, Y. Yao, Y. Chen, J. Dai, S. Lacey, Y. Wang, J. Wan, and T. Li, Graphene Oxide-Based Electrode Inks for 3D-Printed Lithium-Ion Batteries. Advanced Materials, 2016.
5. García-Tuñon, E., S. Barg, J. Franco, R. Bell, S. Eslava, E. D'Elia, R. C. Maher, F. Guitian, and E. Saiz, Printing in three dimensions with graphene. Advanced Materials, 2015. 27(10): p. 1688-1693.
6. Jakus, A. E., E. B. Secor, A. L. Rutz, S. W. Jordan, M. C. Hersam, and R. N. Shah, Three-dimensional printing of high-content graphene scaffolds for electronic and biomedical applications. ACS nano, 2015. 9(4): p. 4636-4648.
7. Zocca, A., H. Elsayed, E. Bernardo, C. Gomes, M. Lopez-Heredia, C. Knabe, P. Colombo, and J. Günster, 3D-printed silicate porous bioceramics using a non-sacrificial preceramic polymer binder. Biofabrication, 2015. 7(2): p. 025008.
8. Maleki, H.; Montes, S.; Hayati-Roodbari, N.; Putz, F.; Huesing, N., Compressible, Thermally Insulating, and Fire Retardant Aerogels through Self-Assembling Silk Fibroin Biopolymers Inside a Silica Structure—An Approach towards 3D Printing of Aerogels. ACS Appl. Mater. Interfaces 2018, 10 (26), 22718-22730.

SUMMARY OF THE INVENTION

Considering the many advantageous properties of silica aerogel-based objects and the potential of AM methods in providing such objects with novel designs of their geometries, it would be highly desirable to provide a simple, reliable and convenient AM methodology for making silica aerogel-based objects. This task is achieved by the present invention.

The invention is generally based on providing a gellable ink composition containing silica aerogel particles, the ink composition having substantial shear thinning properties, namely a reduction in viscosity by a factor between 10 and $10^3$ for an increase in shear rate by a factor of $10^4$ to $10^5$. As initially provided, the ink composition has a viscosity in the range from 5 to 100 Pa·s at shear rate of 50 s$^{-1}$, which could be termed "highly viscous". Under increased shear conditions, particularly under the dynamic conditions prevailing when the ink is forced through a converging nozzle, the resulting increase in shear rate by a factor of $10^4$ to $10^5$ leads to a concomitant reduction in viscosity by a factor of between 10 and $10^3$, thus forming an ink composition which transitorily has "low viscosity" behavior. Once the ink composition has passed the nozzle orifice, it regains its original high viscosity, so that upon being deposited onto a suitable carrier or substrate a rather stable 3D structure is built up. Once the desired 3D structure has been created, a final stabilizing step is carried out by inducing gelation of the gellable sol phase making up the ink formulation. In this manner, the moderately viscous structure is transformed into a substantially rigid structure, thereby completing the AM process. To obtain the desired silica aerogel object, the deposited 3D structure is subjected to a drying step.

It shall be understood that the above described AM process could be carried out stepwise, i.e. after ink writing a first structure having a certain thickness and gelation thereof, further layers could be added.

According to a first aspect (claim 1), there is provided an ink composition for additive manufacture of silica aerogel objects, which essentially consists of a gellable silica sol containing an admixture of 30 to 70 vol.-% of a mesoporous silica powder in a base solvent. The silica sol has an equivalent silica content of 0.02 to 0.12 g/cm$^3$ SiO$_2$ equivalents. The mesoporous silica powder has a particle size range of 0.001 to 1 mm and a tap density of 30 to 200 kg/m$^3$ and comprises at least 10% by weight of silica aerogel powder. The composition is substantially free from trapped air, it has a yield stress in the range of 30 to 3000 Pa and a viscosity of 5 to 150 Pa·s at a shear rate of 50 s$^{-1}$. Moreover, the composition further comprises at least one additive selected from
 a surfactant, and
 a viscosity modifier.
Furthermore, the composition has shear thinning properties defined as a reduction in viscosity by a factor between 10 and $10^3$ for an increase in shear rate by a factor of $10^4$ to $10^5$.

The above term "substantially free of trapped air" shall be understood in the sense that volume fraction of enclosed air bubbles is less than 20%.

The above term "containing an admixture of" shall be understood in the sense of "obtained by adding". In other words, the properties of the mesoporous silica powder admixed into the ink composition refer to the state just before being introduced into the base solvent.

The above term "essentially consisting of" shall be understood in the sense that the ink composition can contain small amounts of further components which do not materially affect the essential characteristics of the ink composition, particularly its rheologic properties.

According to another aspect (claim 13), there is provided a method of preparing an ink composition as defined above, the method comprising the following steps:
 dispersing 30 to 70 vol.-% of a mesoporous silica powder with a tap density in the range of 30-200 kg/m$^3$ and a minimum silica aerogel content of 10% by mass into a gellable silica sol containing the base solvent, wherein the sol has an equivalent silica content of 0.02 to 0.12 g/cm$^3$ SiO$_2$ equivalents
 adding at least one additive selected from
  a surfactant, and
  a viscosity modifier,
 mechanically mixing until a homogeneous, mixture with shear thinning properties is obtained, the mixture exhibiting a reduction in viscosity by a factor between 10 and $10^3$ for an increase in shear rate by a factor of $10^4$ to $10^5$, and
 removing trapped air by means of vacuum treatment, ultrasonication or centrifugation or a combination thereof, thereby obtaining said ink composition.

According to a further aspect (claim 14), there is provided a method of additive manufacturing of a three-dimensional silica aerogel object by direct ink writing, the manufacturing method comprising the following steps:
 a) providing an ink composition as defined above;
 b) forcing the ink composition through a convergent nozzle, thereby forming a jet of the ink composition;
 c) directing the jet according to a predefined directional sequence to form a three-dimensional object by additive manufacturing, the object essentially consisting of said gellable silica sol containing an admixture of 30 to 70 vol.-% of mesoporous silica powder in said base solvent;
 d) initiating and carrying out gelation of the gellable silica sol constituting said object;
 e) optionally carrying out a solvent exchange step, thereby replacing the base solvent by a replacement solvent;
 f) optionally carrying out a surface modification step;
 g) carrying out a drying step, thereby obtaining said three-dimensional silica aerogel object.

The above defined step c) includes the operation of directing the ink jet according to a predefined directional sequence, as known in the field of additive manufacturing. The directional sequence is constructed on the basis of a model of the three-dimensional object to be formed. In simple terms, it defines a trajectory of the ink jet leading to formation of the desired object in a layer-by-layer sequence.

As generally known in the field of sol gel processes, gelation of a silica sol to form a silica gel can be carried out in several ways, which notably include the addition or the in-situ-formation of gelling agents. No particular limitations apply for the selection of gelation methods in the present context.

According to yet another aspect (claim 17), there is provided a three-dimensional silica aerogel object formed by an additive manufacturing method as defined above, the object having a BET surface area of at least 500 m²/g and a BJH pore volume of at least 1.5 cm³/g, the object comprising silica aerogel particles embedded in a silica aerogel matrix, wherein the silica aerogel particles have a higher density than the silica aerogel matrix.

Additive manufacturing (AM) refers to the technology of creating complex 3D shaped parts or objects by means of repeated deposition of layers ("3D printing") of one or multiple materials in a process controlled by a computer using a 3D drawing or graphical representation of the part or object in question. The deposition follows an additive (layer-by-layer) method rather than a subtractive method as it is commonly used in standard machining. Within the subset of existing AM techniques, it is understood that this method uses the direct ink writing (DIW) method, also often referred to as Robocasting, in which an ink with shear thinning properties is printed through a nozzle using a computer-controlled 3D printer. During the printing process, the ink is typically filled into a cartridge featuring a nozzle, which is then used to "write" the desired patterns onto a suitable substrate.

According to the invention, the ink composition satisfies numerous criteria as defined in claim 1. Most prominently, the ink composition must be gellable, meaning that it contains a colloidal sol evenly dispersed in its liquid solvent phase which, when initiated using for example acid or base as an initiator, will undergo a sol-gel transition and hence solidify. The term gellable thus implies the ability of the ink system to irreversibly cure upon initiation by means of a chemical trigger and to thus freeze in the printed solid structure and make it compatible with further processing steps.

The ink formulation further contains a high-volume loading (40%-70%) of a mesoporous silica powder with a desired particle size distribution. The mesoporous silica powder can be selected from the group of mesoporous silica powders such as precipitated silica, fumed silica and preferably silica aerogel powder. The particle size distribution of such powders is typically determined by a commercial particle sizing apparatus. The most commonly used instruments in the particle and ceramics industry are either based on direct optical imaging followed by image processing or by laser light scattering. The mesoporous silica powder is further characterized in terms of its tap density, which can be tested using either commercial tap density testers or simply by filling a certain volume of a powder into a graduated cylinder and tapping it gently onto the benchtop until no further sedimentation/volume change of the packed powder bed is observed with more tapping. The tap density is then obtained by dividing the mass of charged powder over its final "packed bed" volume, which is directly read from the graduated cylinder.

The ink formulation furthermore specifies the content of total silicate contained in the gellable sol in units of grams of $SiO_2$ equivalent per cubic centimeter volume. This range determines the concentration of the dissolved silicate species in the gellable sol and thus gives a lower bound estimate on the density contribution of the sol-gel phase upon printing and successful conversion to an aerogel. Hence the dilution factor specifies how much of the gellable sol is silicate precursor of a given type and how much is base solvent. For example, if a gellable sol were to be made from prehydrolyzing tetraethoxysilane (TEOS, density=0.94 g/cm³) with a $SiO_2$ content of 28% which converts to an equivalent silicate content of 0.263 g/cm³ (again expressed as $SiO_2$), and mixing it with a given base solvent in a one part plus three parts (1 TEOS: 3 base solvent) volume ratio would result in a gellable sol with an equivalent silicate content of 0.066 g/cm³.

The ink formulation must further possess the ability to withstand minor mechanical stress, vibrations etc., which is implemented here in the form of a minimal yield stress requirement. Yield stresses of ink, pastes or slurries are commonly measured using miniaturized testing such as microindentation or a miniaturized plate compression setup.

An essential requirement for the printability attribute of the ink formulation is its high static viscosity and significant shear thinning property, which means a tendency to liquefy when subjected to shear loading and to recover its high viscosity after a shear loading condition has stopped. In particular, this allows having a highly viscous ink formulation which becomes substantially shear-thinned when being pressed through a nozzle and which then recovers its high viscosity after exiting from the nozzle. Accordingly, the term "ink jet" primarily refers to the stream of shear-thinned ink within and immediately outside the nozzle. Once substantial recovery of viscosity has occurred, the ink jet could also be called a "filament". These key ink defining properties (i.e. a maximum initial static viscosity between $10^3$ and $10^6$ Pa·s, a viscosity of 5 to 150 Pa·s at a shear rate of 50 s$^{-1}$ and a reduction in viscosity by a factor between 10 and $10^3$ for an increase in shear rate by a factor of $10^4$ to $10^5$) can be characterized using a standard rotational rheometer or viscometer, ideally using a rotating plate setup.

The ink is further characterized in terms of its composition, that it must contain at least one additive selected from
    a surfactant, and
    a viscosity modifier.

A surfactant is generally known to be a substance causing a decrease of surface tension of a liquid to which it is added.

Rheological modifiers are compounds that can drastically change the viscosity and rheological properties of liquid based systems with relatively small additions of these compounds. In general, two classes of rheology modifiers can be differentiated, namely organic (polymer based) and inorganic ones. Organic rheology modifiers are typically linear polymers with very high molecular weight. The range of chemical compositions is extraordinarily versatile, allowing a rheology modifier to be accessible for many different types of solvent systems. Typical examples include acrylates, hydrogenated castor oils, polyamides, polyethers such as polyethylene glycol (PEG), polypropylene glycol (PPG) or their block copolymers, polyvinylpyrollidone (PVP) but also biopolymers. In the paint and coating industry, inorganic rheology modifiers and particularly organoclays which are essentially organically modified laminar silicates are widely used. Also, unmodified clay type silicates such as laminar- or phyllo-silicates (e.g. hectorite or bentonite) are used because of their low cost and good compatibility with water-based dispersions. Another important class of rheology modifier are the synthetic amorphous silicates. Concerning the choice of "rheology modifier" option as an additive in the ink composition is concerned, it was found that synthetic or biopolymer-based rheology modifiers are the preferred class of material because of the higher efficiency as a low-percentage additive and the synergistic effect with the mesoporous silica powder major component.

Advantageous embodiments are defined in the dependent claims.

According to one embodiment (claim 2), the ink composition further comprises functional micro- or nanoparticles.

Functional micro- or nanoparticles are particulate objects of micro- or nano-metric dimension which also carry a specific chemical or physical function, such as optical properties, catalytic activity, surface chemical properties, stimuli responsive behavior etc.

The following embodiments defined in terms of the ink composition also apply for the selections to be made in the corresponding method of preparing the ink composition. According to one embodiment (claim 3), the mesoporous silica powder contains at least 30% by weight of silica aerogel powder, preferably at least 50% by weight of silica aerogel powder, more preferably at least 65% by weight of silica aerogel powder, and particularly about 100% by weight of silica aerogel powder.

Moreover, it is advantageous for the gellable silica sol to have an equivalent silica content of 0.05 to 0.08 g/cm$^3$ SiO$_2$ equivalents (claim 4).

Preferably (claim 5), the silica aerogel powder has an average particle size range of 0.010 to 0.200 mm.

In certain embodiments, the silica aerogel powder is hydrophobic (claim 6), whereas in other embodiments it is hydrophilic (claim 7).

According to one embodiment (claim 8), the base solvent is a polar solvent, particularly a polar solvent selected from the group consisting of water, acetone and ethyl acetate.

According to another embodiment (claim 9), the base solvent is a non-polar solvent, particularly a non-polar solvent selected from the group consisting of heptane, octane and nonane.

According to yet another embodiment (claim 10), the base solvent is an alcohol solvent, particularly an alcohol solvent selected from the group consisting of ethanol, isopropanol, butanol and pentanol.

In certain advantageous embodiments (claim 11), the gellable silica sol is obtained from a silica precursor selected from the group consisting of waterglass, ion-exchanged waterglass, silicic acid, sodium silicate, tetraethoxysilane, tetramethoxysilane, methyltrimethoxysilane, methyltriethoxysilane and polyethoxydisiloxane.

Advantageously (claim 12), the viscosity modifier is a polymeric viscosity modifier, particularly a polymeric viscosity modifier selected from chitosan, hydroxypropyl cellulose (HPC), polypropylene glycol (PPG), polyethylene glycol (PEG), methoxypolyethylene glycol (MPEG), microfibrillated cellulose (MFC), nanofibrillated cellulose (NFC) and cellulose.

According to an advantageous method of additive manufacturing (claim 15), gelation is initiated through the addition of a solidification agent, particularly an acid or a base, through gas phase or solution phase addition.

According to a further embodiment (claim 16), surface modification is achieved by adding a silica hydrophobizing agent, particularly a hydrophobizing agent selected from hexamethyldisiloxane (HMDSO), hexamethyldisilazane (HMDZ) and trimethylchlorosilane (TMCS).

BRIEF DESCRIPTION OF THE DRAWINGS

The above mentioned and other features and objects of this invention and the manner of achieving them will become more apparent and this invention itself will be better understood by reference to the preceding description of various embodiments of this invention taken in conjunction with the accompanying drawings, wherein are shown:

FIG. 1 a schematic illustration of the principle of this invention, with
(a) the step of ink-writing,
(b) the step of gelation/fixation,
(c) the step of solvent exchange, and
(d) the step of gel drying;

FIG. 2 (a) apparent viscosity as a function of applied shear rate, and
(b) storage modulus (G') and loss modulus (G") as a function of applied shear stress (b),
for ink 003 (round symbols) and ink 006 (square symbols);

FIG. 4 (a) apparent viscosity as a function of applied shear rate, and
(b) storage modulus (G') and loss modulus (G") as a function of applied shear stress (b),
of an MnO$_2$ doped silica aerogel containing ink; and FIG. 5 a three-dimensional silica aerogel object formed by additive manufacturing, with electron micrographs showing
(a) an outer surface of a printed filament, with magnification 300×;
(b) an enlarged view, with magnification 3000×, of the marked region in (a), showing interlocked aer-ogel particles (darker grey) embedded in a low-density aerogel matrix (lighter grey);
(c) and (d) further enlarged regions, with magnifications 10000× and 25000×, respectively, wherein SP1 and SP2 denote high-denisty and low-density silica particles, respectively.

DETAILED DESCRIPTION OF THE INVENTION

The method of additive manufacturing of a three-dimensional silica aerogel object by direct ink writing is illustrated in FIG. 1. As shown in FIG. 1a, a device 2 for carrying out the method comprises an ink reservoir 4 containing an ink composition 6. The latter is forced through a convergent nozzle 8, thereby forming a jet of the ink composition. Using an appropriate and basically known positioning system, the ink jet is directed in such manner as to form a three-dimensional object 10 by additive manufacturing. In a next step, as shown in FIG. 1b, the object 10 is transferred into a closed vessel 12 containing a gaseous gelation catalyst 14. Initially, the object 10 essentially consists of a gellable silica sol, but under the influence of the gelation catalyst the object is turned into a gel form. Optionally, as shown in FIG. 1c, a solvent exchange step is carried out whereby the base solvent present in the gel is replaced by a replacement solvent 16. After an optional surface modification step, a drying step is carried out as shown in FIG. 1d. For this purpose, the gelled and optionally solvent exchanged object is placed into an autoclave 18 equipped with a vent 20. After an appropriate drying time, a three-dimensional silica aerogel object 22 has formed.

Examples 1-9: Ink Preparations

Examples 1-9 describe detailed examples of ink preparations suitable for direct ink writing of silica aerogel objects using following starting materials:

Ethyl silicate with a silicon dioxide equivalent content of approximately 40-42 wt. %, obtained as Dynasylan® 40 from Evonik Resource Efficiency GmbH;
1-pentanol 98%, supplied by ABCR Schweiz AG;

Ultrapure water (double distilled, >18 MΩ·cm);
Nitric acid ($HNO_3$) 70%, supplied by Sigma-Aldrich;
Poly(propylene glycol) bis(2-aminopropyl ether) (PPGNH, average Mn~4,000), supplied by Sigma-Aldrich;
Hydrochloric acid (HCl) 37%, obtained from Sigma-Aldrich;
Ammonia solution (28-30%), supplied by Sigma-Aldrich;
Hydrophobic (trimethylsilyl modified) silica aerogel particles (amorphous, 5-20 μm), obtained as ENOVA® IC3100 from Cabot Aerogel GmbH.

Polyethoxydisiloxane (PEDS) precursor (sol concentrate) preparation. 173 ml ethyl silicate with a silicon dioxide equivalent content of approximately 40-42 wt. % was mixed with 189 ml isopropanol (or ethanol or 1-pentanol) and 13.5 ml ultrapure water at 35° C., after stirring at 250 r.p.m. for 10 mins, the solution was cooled down to 25° C., with a continuous stirring at 250 r.p.m., aqueous 0.06 M $HNO_3$ solution was added dropwise at a rate of 0.45 ml/min by using a syringe pump (LaboTechSystems LTS AG). The as-prepared silica sol concentrate precursor was kept at 4° C. for 24 hours before use.

Silica ink preparation. The ink was prepared first by mixing 7.3 g 1-pentanol with 0.7 g poly(propylene glycol) bis(2-aminopropyl ether) (PPGNH) at room temperature (25° C.) and stirring for 5 mins. Next 12 M HCl (37%) was added to adjust the pH value, and then 4 g polyethoxydisiloxane sol concentrate precursor was added to the base solvent mixture, and was mixed thoroughly at 500 rpm for 5 min. After that, a desired amount of hydrophobic (trimethylsilyl modified) silica aerogel particles (SAP) (amorphous, 5-20 μm) was added to achieve required rheological properties for direct ink writing, the amount of aerogel particles is specified in Table 1. The blend was then mixed in a planetary speedmixer or centrifuge for 7 minutes at 3000-3500 rpm.

TABLE 1

Composition of gellable silica inks in grams

| | Compositions [grams] | | | |
|---|---|---|---|---|
| | 1-Pentanol | PPGNH | PEDS | SAP |
| Example 1 | 7.3 | 0.7 | 4 | 1.14 |
| Example 2 | 7.3 | 0.7 | 4 | 1.27 |
| Example 3 | 7.3 | 0.7 | 4 | 1.41 |
| Example 4 | 7.3 | 0.7 | 4 | 1.52 |
| Example 5 | 7.3 | 0.7 | 4 | 2.0 |

Modified Ink Compositions, Example 6

An ink was prepared in an identical fashion as described in the above procedure for examples 1 through 5, with the difference that 7.5 ml of a 1:3 by volume mixture of isopropanol and nonane was used as a base solvent instead of pentanol.

Modified Ink Compositions, Example 7

An ink was prepared in an identical fashion as described in the above procedure for examples 1 through 5, with the only difference that 0.8 g hydroxypropyl cellulose (HPC) was used as a viscosity modifier instead of PPGNH.

Modified Ink Compositions, Example 8

An ink was prepared in an identical fashion as described in the above procedure for examples 1 through 5, with the difference that the sol was prepared from a 8:41 by volume mixture of Methyltriethoxysilane (MTES) and Tetraethoxysilane (TEOS) by co hydrolysis in isopropanol and that the base solvent system was replaced by a 1:7 mixture of isopropanol and nonane (instead of pentanol).

Modified Ink Compositions, Example 9

An ink was prepared in an identical fashion as described for example 3 in the above procedure, with the only difference that silica aerogel powder was replaced by a 15:85% by mass mixture of hydrophobic (trimethylsilyl modified) silica aerogel particles (amorphous, 5-20 μm) and hydrophobic fumed silica (fumed silica treated with HDMS, obtained as Aerosil R-812, Evonik industries).

Figure 1A:
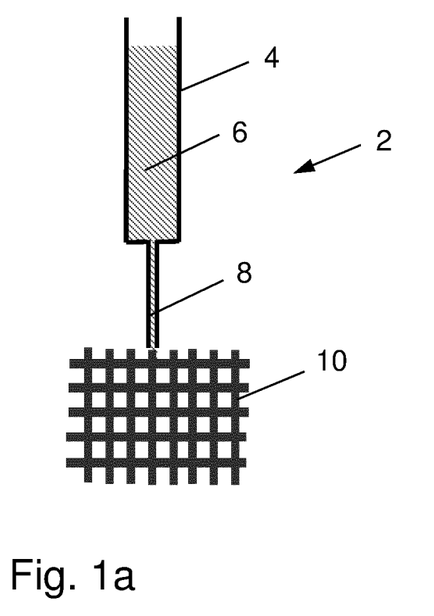
Figure 1B:
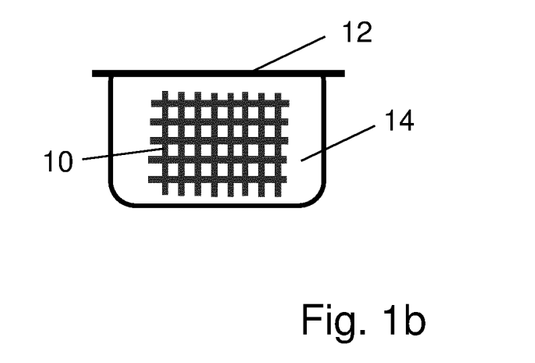
Figure 1C:
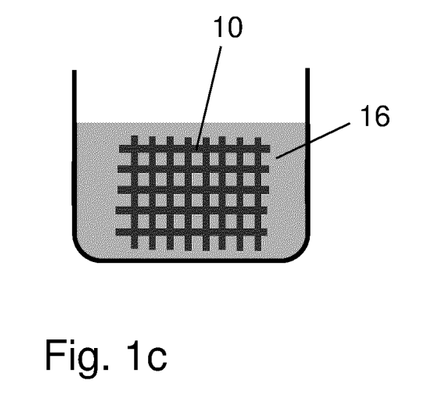
Figure 1D:
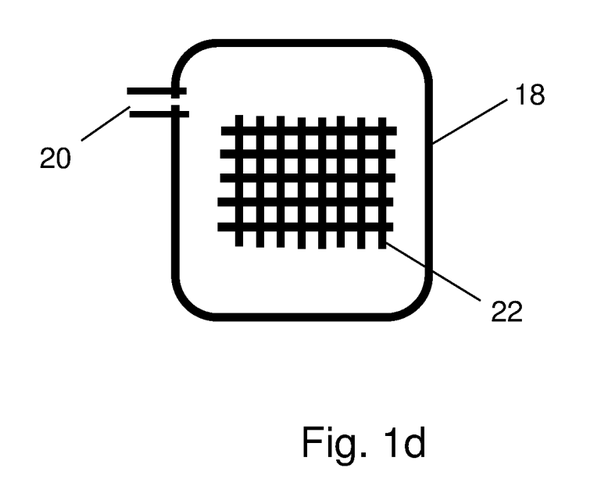
Figure 2A:
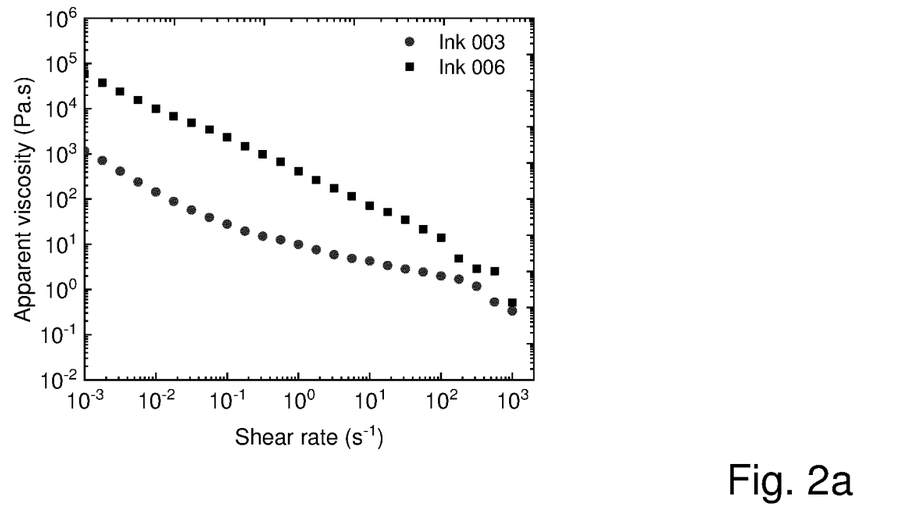
Figure 2B:
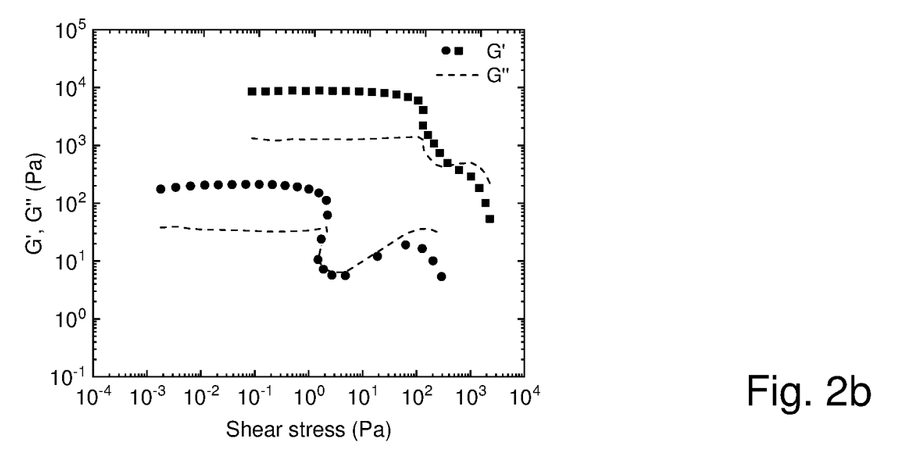
Figure 3:
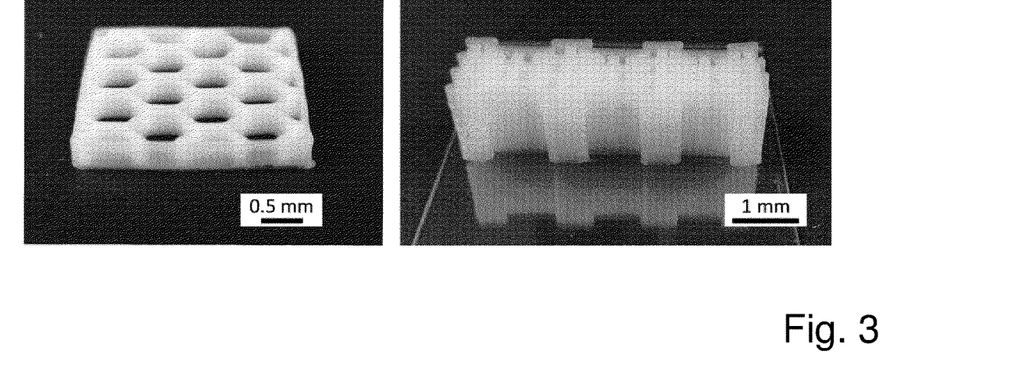
FIG. 3 (a) a ten-layer honeycomb, and
(b) a 50 layers multi-wall object,
made from silica aerogel that were 3D printed from a 410 μm conical nozzle.
Figure 4A:
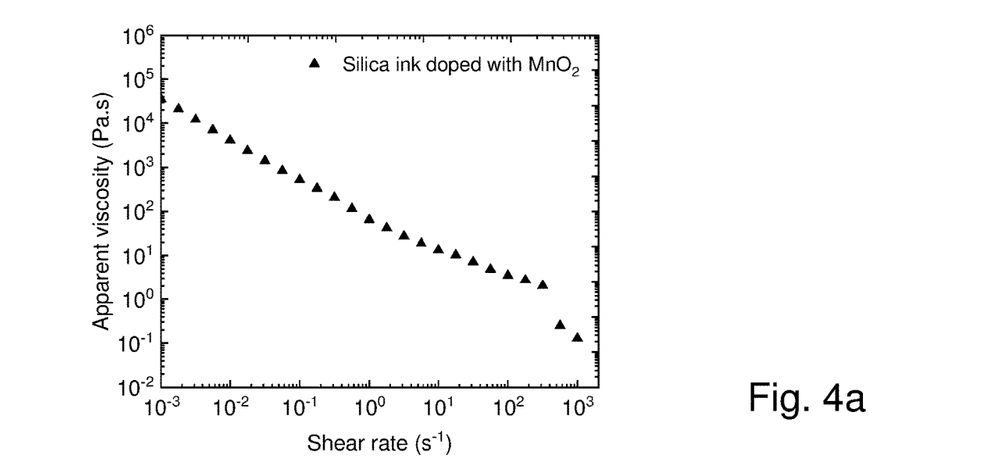
Figure 4B:
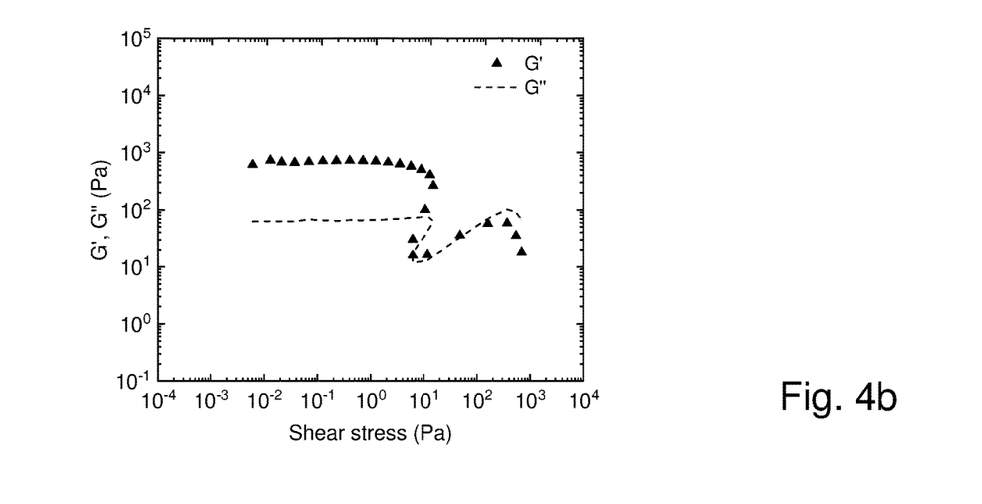
Figure 5A:
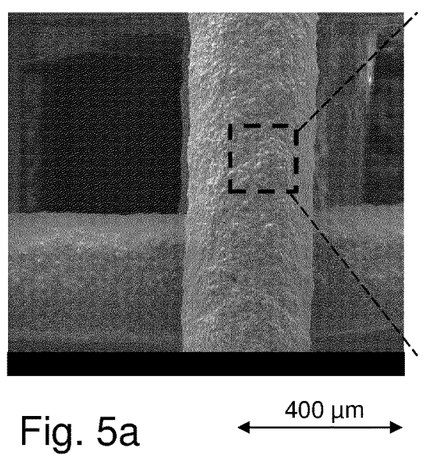
Figure 5B:
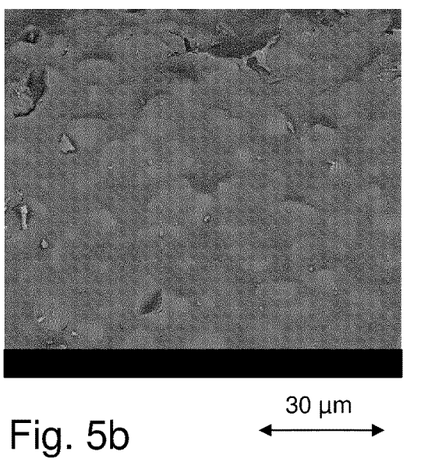
Figure 5C:
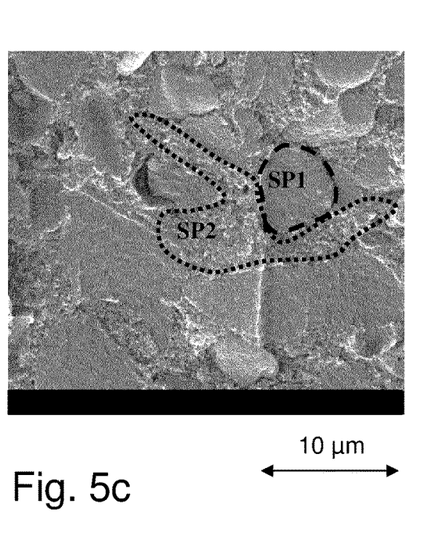
Figure 5D:
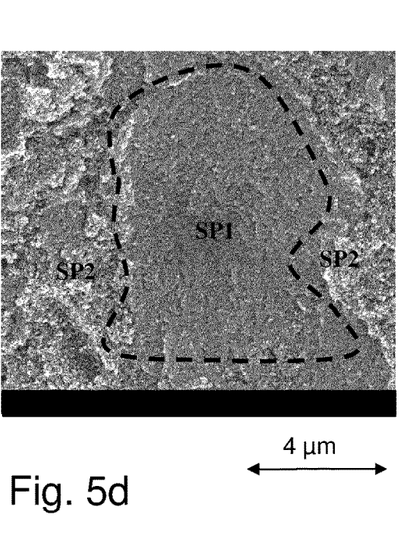

Direct ink writing, Examples 10 and 11. Two as prepared silica inks were tested for their rheological properties before printing. A typical rheological characterization of example/ink 001 and example/ink 004 is shown below in FIG. 2. The as prepared gellable ink was loaded into empty, capped syringe barrels and centrifuged at 2,500-5,000 r.p.m. for 3 min to remove trapped air bubbles. The ink syringes were mounted into a Bioplotter printer (EnvisionTEC). Conical nozzles with inner diameter 200-410 μm (Smoothflow Tapered Tip, Hilgenberg) were used for printing the different inks. Printing patterns were generated by a CAD drawing software and converted into G-code and custom scripts to command the x-y-z motion of the printer head. Various replicate objects were then printed onto a glass substrate in an open laboratory atmosphere.

Initiation of the gelation, postprocessing and drying. The printed objects were placed inside a closed polystyrene box, containing a tray with 10 ml of a 5.5 M ammonia solution, however there was no contact of said ammonia solution with the printed objects. The $NH_3$ gas atmosphere then leads to leads a change of pH inside the printed objects and gelation of the silica sol phase. After the gelation and resulting solidification, the printed objects were covered with ethanol. The silica gel phase silica phase then hydrophobized by soaking the objects in a dilute solution of hexamethyldisilazane in ethanol with an EtOH/HMDZ molar ratio of 17:1 at RT for 24 hours. As obtained printed and hydrophobized gel objects were finally dried from supercritical carbon dioxide ($CO_2$).

Final printed aerogel replicate objects obtained in this way show a bulk density of 0.18±0.02 g $cm^{-3}$ and a BET surface area of 751 $m^2$ $g^{-1}$ and a BJH pore volume of 3.16 $cm^3$ $g^{-1}$ Example 12

The compatible additives could be added into the silica ink to bring new functions, Example 12 demonstrates an ink formulation with the addition of $MnO_2$ microspheres, the 35 wt. % silica aerogel particles in the ink 006 were replaced by the ramsdellite $MnO_2$ microsphere, and the ink preparation follows the same procedure developed for Examples 1-9.

The printed objects show bulk density of 0.20±0.02 g $cm^{-3}$, and a BET surface area of 658 $m^2$ $g^{-1}$ and a BJH pore volume of 3.53 $cm^3$ $g^{-1}$.

Example 13

Example 13 describes an example of 3D printing a hydrophilic aerogel object using the following starting materials.

Tetraethyl orthosilicate (TEOS, 98%), supplied by Sigma-Aldrich;

Low molecular weight (LMW) chitosan, supplied by Sigma-Aldrich;

HCl (37%), obtained from Sigma-Aldrich;

Acetic acid (≥99%), obtained from Sigma-Aldrich;

Hydrophobic (trimethylsilyl modified) silica aerogel particles (amorphous, 5-20 μm).

Silica aerogel particles were treated in a tube furnace under air atmosphere at 640° C. for 6 hours. Then grinded up to around 10-50 μm diameter hydrophilic particles.

At room temperature, 0.5 g low molecular weight (LMW) chitosan was dissolved in 20 ml $H_2O$ with an assist of 0.5 ml acetic acid. After 4 hours, 1.5 ml TEOS was added, and the solution was stirred vigorously for another 4 hours, then the hydrophilic silica particles were added, the blend was speed mixed at 3,000 rpm for 5 mins, then 3,500 rpm for 2 mins.

The direct ink writing process follows the same procedure developed for Examples 1-9.

The printed objects were placed in a closed polystyrene box, and 1 M ammonia ethanol solution was added into the box to cover the printed samples. After the solidification, the objects were washed 3 times in 2 days with ethanol. The gels were finally supercritical dried from carbon dioxide ($CO_2$).

The printed objects show a bulk density of 0.21±0.03 g $cm^{-3}$ and a BET surface area of 203 $m^2$ $g^{-1}$ and a BJH pore volume of 0.71 $cm^3$ $g^{-1}$.

Example 14

Example 14 describes an example of 3D printing a hydrophilic aerogel object using the following starting materials.

Sodium silicate solution (26.5% w/w $SiO_2$, molar ratio $Na_2O$:$SiO_2$: 1:3.1, pH=11.5), supplied by Sigma-Aldrich;

Polyethylene glycol (PEG solution, MW 4000-10000), supplied by Sigma-Aldrich;

HCl (37%), obtained from Sigma-Aldrich;

Hydrophobic (trimethylsilyl modified) silica aerogel particles (amorphous, 5-20 μm).

Silica aerogel particles were treated in the furnace at 640° C. for 6 hours to render them hydrophilic and then ground into particle form with a typical diameter in the range from 10-50 μm.

At room temperature, 8.5 ml water glass was diluted with 41.5 ml $H_2O$ to prepare an aqueous water glass solution, and the waterglass solution was passed through an Amberlyst 15 ion exchange resin in its protonated form to generate silicic acid sol. 10 ml Ion exchanged waterglass was mixed first with 0.75 ml PEG solution. The pH was adjusted by 0.03 ml HCl to around 2-3, and then hydrophilic silica particles were added. The aerogel particle suspension/sol slurry was speed mixed at 3,000 rpm for 5 mins, then 3,500 rpm for 2 mins.

The direct ink writing, solidification and drying process follows the same procedure developed for Example 13.

Example 15

Two identical square planar boards (55×55×7 $mm^3$) were printed from ink in example 2 with a conical nozzle of diameter 1200 μm. After gelation and drying processes, the board samples were placed in a custom-built guarded hot plate device for thermal conductivity measurement (guarded zone: 50×50 $mm^2$, measuring zone: 25×25 $mm^2$, 50% RH, 25° C.), the setup was designed for small specimens of low thermal conductivity materials. And the thermal conductivity is 15.9±0.4 mW $m^{-1}K^{-1}$.

The invention claimed is:

1. An ink composition for additive manufacture of silica aerogel objects, comprising:
a gellable silica sol containing an admixture of 30 to 70 vol.-% of a mesoporous silica powder in a base solvent,
the silica sol having an equivalent silica content of 0.02 to 0.12 $g/cm^3$ $SiO_2$ equivalents,
the mesoporous silica powder having a particle size range of 0.001 to 1 mm and a tap density of 30 to 200 $kg/m^3$ and comprising at least 10% by weight of silica aerogel powder,
the composition being substantially free from trapped air,
the composition having a yield stress in the range of 30 to 3000 Pa,
the composition having a viscosity of 5 to 150 Pa·s at a shear rate of 50 $s^{-1}$,
the composition further comprising at least one additive selected from
a surfactant, and
a viscosity modifier,
and the composition having shear thinning properties defined as a reduction in viscosity by a factor between 10 and $10^3$ for an increase in shear rate by a factor of $10^4$ to $10^5$.

2. The ink composition according to claim 1, further comprising functional micro- or nanoparticles.

3. The ink composition according to claim 1, wherein the mesoporous silica powder contains at least 30% by weight of silica aerogel powder.

4. The ink composition according to claim 1, wherein the gellable silica sol has an equivalent silica content of 0.05 to 0.08 $g/cm^3$ $SiO_2$ equivalents.

5. The ink composition according to claim 1, wherein the silica aerogel powder has an average particle size range of 0.010 to 0.200 mm.

6. The ink composition according to claim 1, wherein the silica aerogel powder is hydrophobic.

7. The ink composition according to claim 1, wherein the silica aerogel powder is hydrophilic.

8. The ink composition according to claim 1, wherein the base solvent is a polar solvent.

9. The ink composition according to claim 1, wherein the base solvent is a non-polar solvent.

10. The ink composition according to claim 1, wherein the base solvent is an alcohol solvent.

11. The ink composition according to claim 1, wherein the gellable silica sol is obtained from a silica precursor selected from the group consisting of waterglass, ion-exchanged waterglass, silicic acid, sodium silicate, tetraethoxysilane, tetramethoxysilane, methyltrimethoxysilane, methyltriethoxysilane and polyethoxydisiloxane.

12. The ink composition according to claim 1, wherein the viscosity modifier is a polymeric viscosity modifier.

13. A method of preparing the ink composition of claim 1, comprising:
dispersing the 30 to 70 vol.-% of the mesoporous silica powder with the tap density in the range of 30-200 $kg/m^3$ and a minimum silica aerogel content of 10% by mass into the gellable silica sol containing the base solvent, wherein the sol has the equivalent silica content of 0.02 to 0.12 $g/cm^3$ $SiO_2$ equivalents, adding the at least one additive selected from the group consisting of
a surfactant, and
a viscosity modifier,
mechanically mixing until a homogeneous mixture with shear thinning properties is obtained, the mixture exhibiting the reduction in viscosity by a factor between 10 and $10^3$ for the increase in shear rate by a factor of $10^4$ to $10^5$, and
removing trapped air via vacuum treatment, ultrasonication or centrifugation or a combination thereof, thereby obtaining said ink composition.

14. A method of additive manufacturing of a three-dimensional silica aerogel object by direct ink writing, comprising:
a) providing an ink composition as defined in claim 1;
b) forcing the ink composition through a convergent nozzle, thereby forming a jet of the ink composition;
c) directing the jet according to a predefined directional sequence to form a three-dimensional object by additive manufacturing, the object comprising said gellable silica sol containing an admixture of 30 to 70 vol.-% of mesoporous silica powder in said base solvent;
d) initiating and carrying out gelation of the gellable silica sol constituting said object;
e) optionally carrying out a solvent exchange step, thereby replacing the base solvent by a replacement solvent;
f) optionally carrying out a surface modification;
g) carrying out a drying, thereby obtaining said three-dimensional silica aerogel object.

15. The additive manufacturing method according to claim 14, wherein gelation is initiated through the addition of a solidification agent, particularly an acid or a base, through gas phase or solution phase addition.

16. The additive manufacturing method according to claim 14, wherein surface modification is achieved by adding a silica hydrophobizing agent, particularly a hydrophobizing agent selected from hexamethyldisiloxane, hexamethyldisilazane and trimethylchlorosilane.

17. A three-dimensional silica aerogel object formed by an additive manufacturing method according to claim 14, the object having a BET surface area of at least 500 $m^2/g$ and a BJH pore volume of at least 1.5 $cm^3/g$, the object comprising silica aerogel particles embedded in a silica aerogel matrix, wherein the silica aerogel particles have a higher density than the silica aerogel matrix.

18. The ink composition according to claim 1, wherein the composition essentially consists of the gellable silica sol containing the admixture of 30 to 70 vol.-% of the mesoporous silica powder in the base solvent, and is
substantially free from trapped air,
has a yield stress in the range of 30 to 3000 Pa,
has a viscosity of 5 to 150 Pa·s at a shear rate of 50 $s^{-1}$,
comprises at least one additive selected from
a surfactant, and
a viscosity modifier,
and has shear thinning properties defined as a reduction in viscosity by a factor between 10 and $10^3$ for an increase in shear rate by a factor of $10^4$ to $10^5$.

19. The ink composition according to claim 3, wherein the mesoporous silica powder contains at least 50% by weight of silica aerogel powder, at least 65% by weight of silica aerogel powder, or 100% by weight of silica aerogel powder.

20. The ink composition according to claim 8, wherein the polar solvent is selected from the group consisting of water, acetone and ethyl acetate.

21. The ink composition according to claim 9, wherein the non-polar solvent is selected from the group consisting of heptane, octane and nonane.

22. The ink composition according to claim 10, wherein the alcohol solvent is selected from the group consisting of ethanol, isopropanol, butanol and pentanol.

23. The ink composition according to claim 12, wherein the polymeric viscosity modifier is selected from chitosan, hydroxypropyl cellulose, polyethylene glycol, methoxypolyethylene glycol, microfibrillated cellulose, nanofibrillated cellulose and cellulose.

* * * * *